United States Patent [19]
Gardner

[11] Patent Number: 5,143,467
[45] Date of Patent: Sep. 1, 1992

[54] FASTENING SYSTEM

[76] Inventor: Ernest A. Gardner, 142½ Canal Ave., NW., Canal Fulton, Ohio 44614

[21] Appl. No.: 775,014

[22] Filed: Oct. 11, 1991

[51] Int. Cl.⁵ .............................................. F16D 1/00
[52] U.S. Cl. ...................... 403/24; 403/388; 403/393; 403/408.1; 24/72.7
[58] Field of Search ............... 403/388, 393, 408.1, 403/24; 24/72.7, 453; 411/337, 554

[56] References Cited

U.S. PATENT DOCUMENTS

| 613,902 | 11/1898 | Grace | 24/72.7 X |
| 1,297,228 | 3/1919 | Osmun | 403/393 X |
| 1,628,249 | 5/1927 | Kirfman | 403/393 X |
| 1,666,783 | 4/1928 | Kries | 411/337 |
| 3,990,131 | 11/1976 | Okamura | 24/453 |

FOREIGN PATENT DOCUMENTS

| 111310 | 7/1964 | Czechoslovakia | 403/408 |
| 467002 | 10/1928 | Fed. Rep. of Germany | 160/232 |
| 2258554 | 8/1975 | France | 403/388 |

Primary Examiner—Andrew V. Kundrat
Attorney, Agent, or Firm—Paul E. Milliken; Lee A. Germain

[57] ABSTRACT

This invention provides a fastening system comprised of at least two pieces to be fastened together, the pieces exhibiting planar characteristics and each piece is characterized by having at least one slotted through bore in the material comprising the piece and, a fastener having a stem portion and orthogonally oriented cross bar portions at each of its ends to define an I-shaped configuration, the fastener interconnecting the pieces together in planar face-to-face orientation by having one of its cross bar portions passed through the slotted bore in one of the pieces and having the other cross bar portion passed through the slotted bore in the other of the pieces such that the stem portion is in a seated engagement within the bores of the pieces.

21 Claims, 3 Drawing Sheets

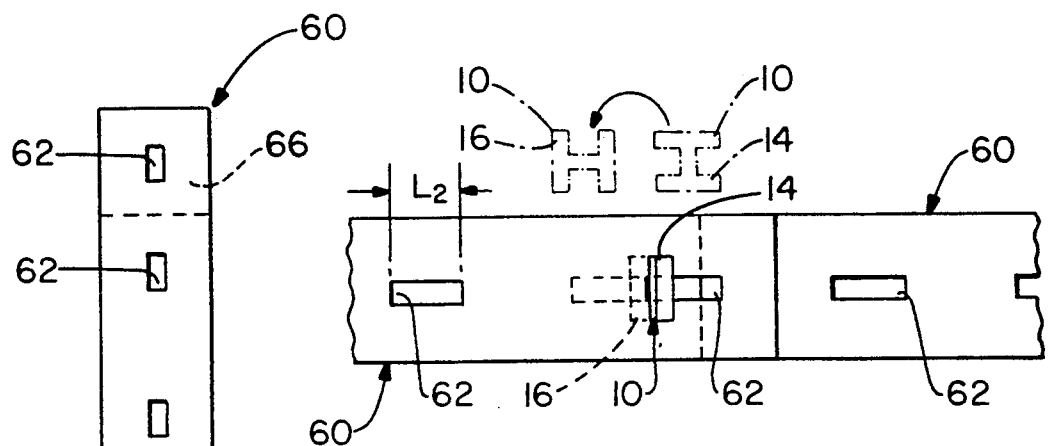
FIG.-9
FIG.-10
FIG.-8

5,143,467

FASTENING SYSTEM

FIELD OF THE INVENTION

This invention pertains generally to a system for fastening two or more substantially planar pieces together in a relatively face-to-face orientation one with respect to the other.

More particularly, this invention provides a system for fastening which operatively connects pieces together by way of slotted through bores in the pieces to be interconnected and a uniquely configured fastener which is passed through the pieces to interlock them together forming a substantially unitary structure.

BACKGROUND OF THE INVENTION

Many and various types of fasteners and/or fastening systems have been developed and these are known and used in many industries to fasten or interlock pieces together in either a permanent manner or a substantially semi-permanent reusable manner. This invention may be applied to both permanent and semi-permanent fastening applications and the manner of its use is not considered a limiting factor in the scope of the invention. Preferably, the inventive concept will be applied to applications wherein the pieces which are to be fastened together may be unfastened and/or separated for later reconfiguration.

Accordingly, it is an object of this invention to provide a fastening system including a fastener which may be applied to many and various types of applications and which may be made from a wide variety of materials, in large quantities, and which is foolproof in the manner of its installation.

SUMMARY OF THE INVENTION

The advantages of the fastening system which comprises the invention may be accomplished by providing at least two pieces to be fastened together with slotted through bores in the material comprising the pieces; and a fastener having a stem portion and orthogonally oriented cross bar portions at each of its ends to define an I-shaped configuration, the fastener interconnecting the pieces together in planar face-to-face orientation by having one of its cross bar portions passed through the slotted bore in one of the pieces and having its other cross bar portion passed through the slotted bore in the other piece such that the stem portion is seatingly engaged within the bores of the pieces.

BRIEF DESCRIPTION OF THE DRAWINGS

This invention will best be appreciated and understood from a consideration of the following detailed description when taken in conjunction with the accompanying drawings, in the several figures of which like-reference numerals are used to identify like elements and/or members and wherein:

FIG. 8 is a plan view, similar to FIG. 6, illustrating another alternative slotted through bore in a piece of material which will accept the fasteners shown in FIGS. 1 and 7;

FIG. 9 is an enlarged plan view of the terminal ends of the piece illustrated in FIG. 8 illustrating the manner of fastening the ends together and/or the ends of other similar pieces together; and FIG. 10 illustrates various geometric shapes which may be applied to the cross-section of the fastener.

DETAILED DESCRIPTION OF THE INVENTION

Figure 1:
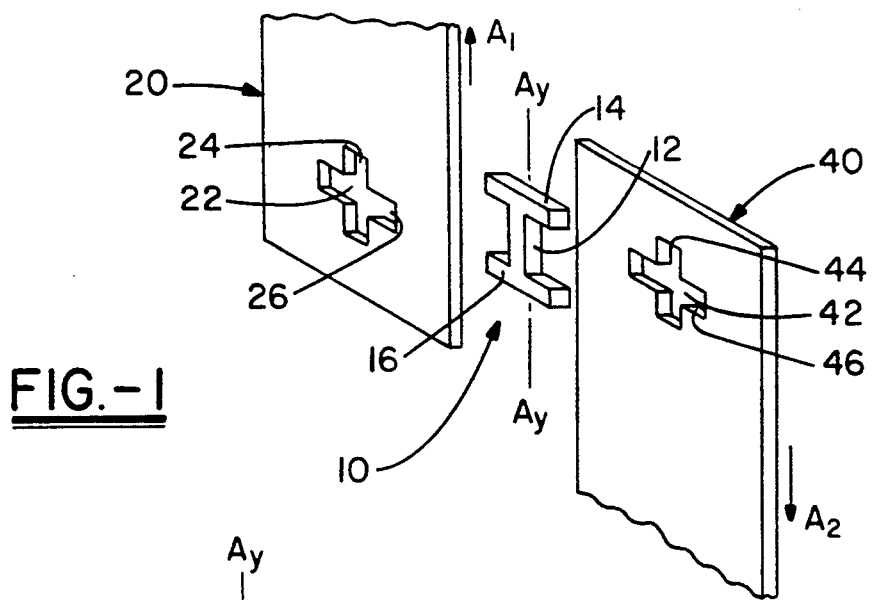
FIG. 1 is a perspective view, with some parts broken away, illustrating a fastening system in accordance with the invention wherein two planar pieces are connected together by way of a uniquely configured fastener.
Figure 2:
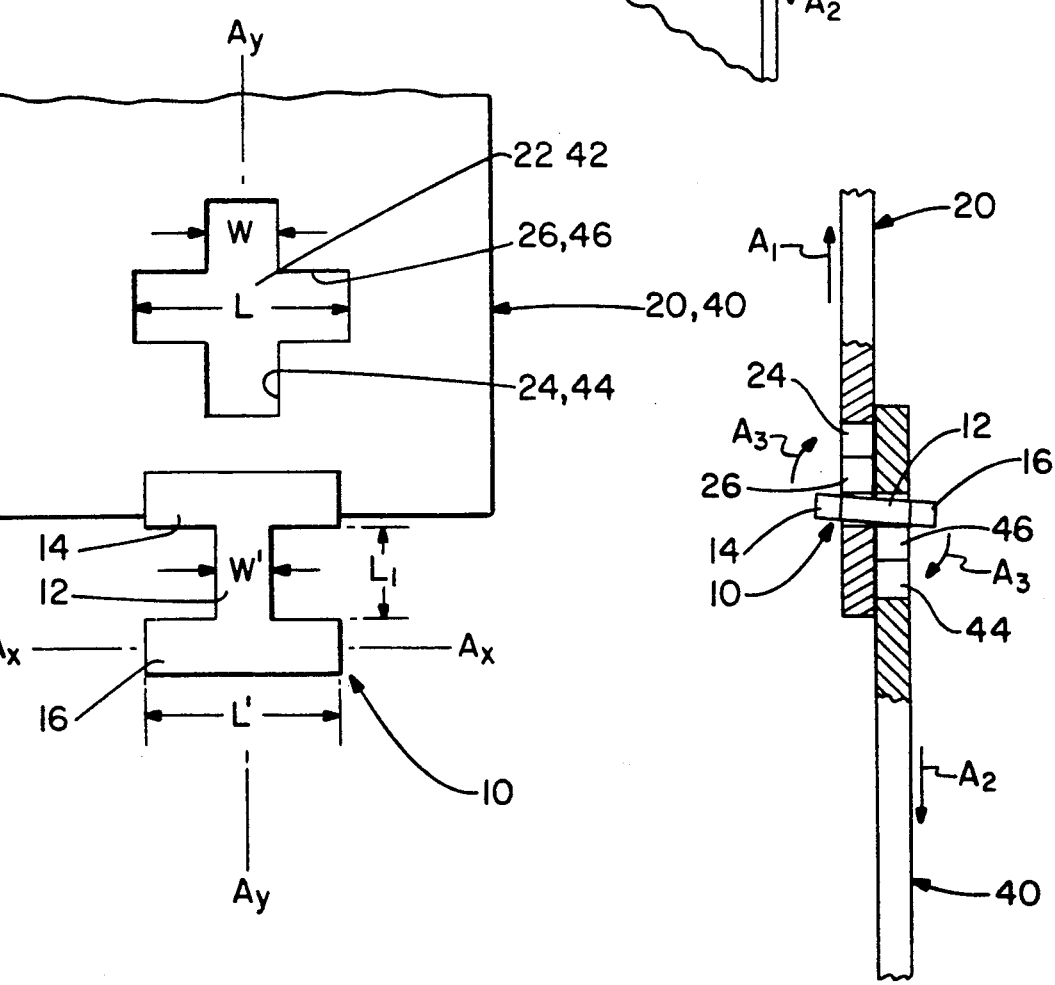
FIG. 2 is a greatly enlarged plan view of a planar piece illustrating a first embodiment of a slotted through bore in the piece and a fastener shown in elevational view as these may be applied to interconnecting multiple pieces together.

Referring to FIGS. 1 and 2 of the drawings, a fastening system in accordance with this invention is illustrated, the system including a primary fastener which is generally indicated by reference numeral 10. The fastener 10 is characterized by an "I-shaped" configuration when considered in a substantially vertical orientation with respect to the $A_y$ axis as shown in the drawing, but, it may also be said to exhibit an "H-shaped" configuration if rotated 90° to the orthogonal or horizontal $A_x$ axis. While both of these descriptions of the fastener 10 may be applicable to its shape, this description will be with respect to the I-shaped configuration when its usage is primarily in the vertical orientation, and it will be with respect to an H-shaped configuration when its usage is primarily in the horizontal orientation.

The fastener 10 comprises a central stem portion 12 having a cross bar portion 14 orthogonally positioned across one of its ends and a cross bar portion 16 orthogonally positioned across the opposite end. The stem 12 and its cross bar portions 14 and 16 thus define the "I" and/or "H" shape of the fastener 10. As illustrated in FIG. 1, the fastener 10 is intended to be used as an interconnecting device for at least two pieces which are indicated generally at reference numerals 20 and 40 respectively. The pieces 20,40 are brought together in a planar face-to-face orientation, and this, by way of a slotted through bore 22 in the piece 20 and a slotted through bore 42 in the piece 40. The bores 22 and 42 may be characterized by a cross-slotted configuration comprising a vertically oriented slot 24 and 44 respectively and by a horizontally oriented slot 26 and 46 respectively. The vertical slots 24,44 are intersected by the horizontal slots 26,46 to define cross-slotted bores 22 and 42 within each of the pieces 20 and 40. The interconnection of the pieces is accomplished by, for example, inserting the cross bar 14 of the fastener 10 into and through the horizontal slot 26 of the bore 22 in piece 20 and inserting the cross bar 16 through the horizontal slot 46 of the bore 42 in piece 40. The pieces 20 and 40 are then moved in the direction of arrows A1 and A2 respectivly and this movement seats the stem portion 12 of the fastener 10 within the vertical slots 24 and 44 of the pieces.

Referring to FIG. 2 of the drawings, the dimensions of the vertical slotted through bores 24 and 44 and the horizontal slotted through bores 24 and 46 are substantially the same exhibiting a length "L" which is slightly longer than the length L' of the cross bar portions 14 and 16 of the fastener 10. Thus, the cross bars 14,16 may be inserted through either of the vertical and/or horizontal slotted bores with a slight interference. The width "W" of the slotted bores 24,26 and 44,46 is also substantially the same and this is just slightly wider than the width W' of the stem portion 12 and/or of the cross bar portions 14 and 16. Accordingly, when a fastener 10 is placed in seated relationship within the bores 22,42 of the pieces, there will be very little relative movement as between the pieces.

Figure 3:
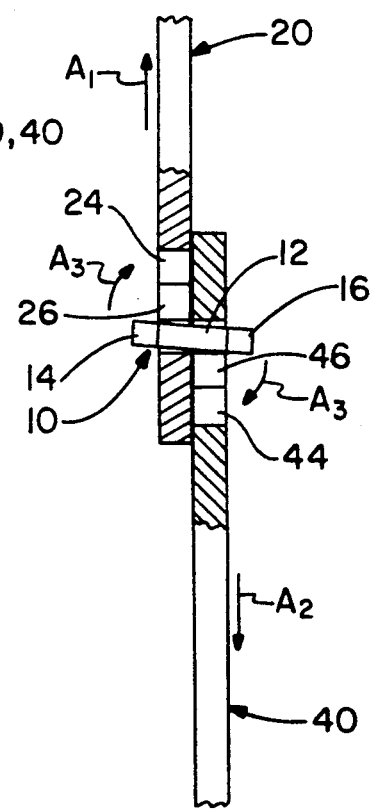
FIG. 3 is a side elevational view, in partial cross-section, of the fastener as it may be applied to connecting two planar pieces together as illustrated in FIG. 1.
Figure 4:
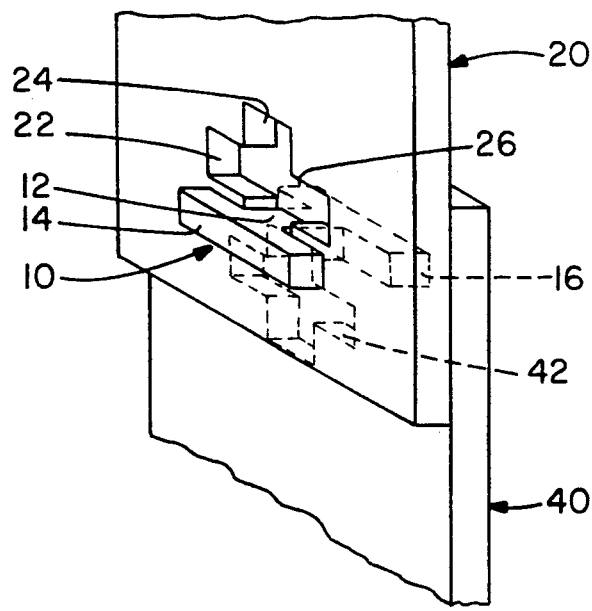
FIG. 4 is a perspective view of the fastener and its associated pieces as these may be assembled in a substantially locked interconnection of the pieces.

Referring now also to FIGS. 3 and 4 of the drawings, one can appreciate that the stem portion 12 may be varied in its length $L_1$ which is the distance between the cross bar portions 14 and 16 as illustrated. This variation in length may be used to accommodate various numbers of pieces which may be fastened together and/or to accommodate variations in the thickness dimensions of the pieces. As clearly illustrated in the drawings, when two pieces 20 and 40 are fastened together via the fastener 10, the cross bar portions 14 and 16 remain outside of the planes of the pieces while the stem portion 12 spans the combined guage thicknesses of the pieces. From this it will be recognized that, while the pieces 20 and 40 are illustrated as exhibiting substantially equal thickness cross-sections, they may as well have substantially different cross-sectional dimensions and the fastener 10 may be varied in stem length $L_1$ such as to accommodate these type of variations. This invention, therefore, is not considered limited by the specific dimensions of the fastener 10, suffice to say that such fastener may interconnect pieces together in planar face-to-face orientation by passing the cross bar portions through slotted receiving bores in the pieces.

When two pieces 20 and 40 are fastened together as these are illustrated in the figures and then moved relatively in the direction of arrows $A_1$ and $A_2$ respectively to seat the fastener 10, the relative movement creates a locking affect in the direction of arrows $A_3$ and this forces the pieces to a contacting face-to-face arrangement. Obviously, this will effectively maintain the pieces in their vertical and horizontal orientations.

Figure 5:
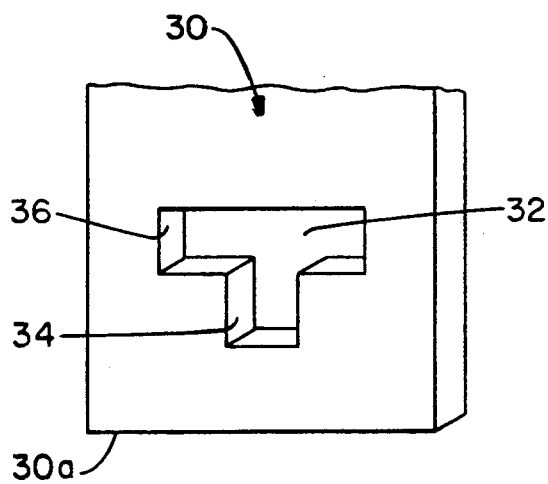
FIG. 5 is an enlarged perspective view of an alternative T-shaped through bore in a planar piece which may be fastened to a similar piece by way of the fastener of this invention.

Referring to FIG. 5 of the drawings, an alternative configuration for a cross-slotted through bore is illustrated and indicated by reference numeral 32 as it may be formed or otherwise cut through the material comprising a piece generally indicated by reference numeral 30. The slotted bore 32 is substantially "T-shaped" having a stem portion 34 positioned longitudinally and toward the end edge 30a of the piece 30. Obviously, the fastener 10 may have one of its cross bars 14 or 16 passed through the horizontally oriented slot 36 and locked in place within the stem portion 34 in the same manner as hereinbefore described with respect to the cross-slotted bores 22 and 42 in the pieces 20 and 40 respectively.

Figure 6:
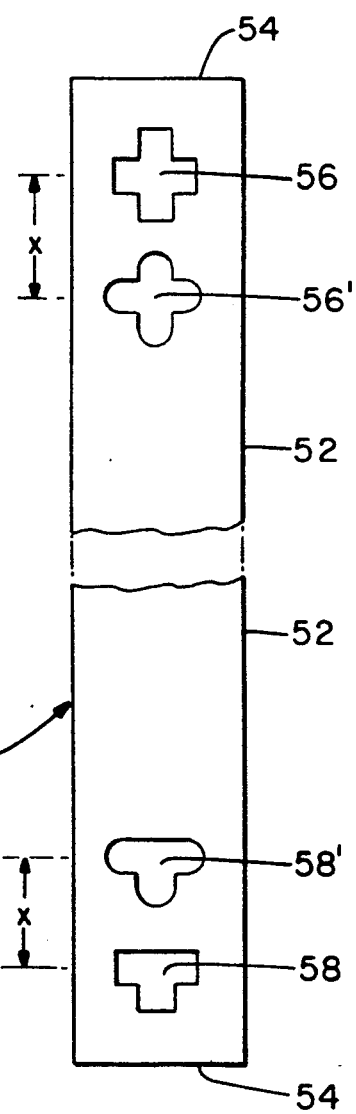
FIG. 6 is a plan view of a strap or belt type piece which benefits from the fastening system of this invention.

In FIG. 6 a particular piece 50 is illustrated, which piece benefits from the uniquely configured fastener 10. The piece 50 comprises a length of thin guage material, preferably a metallic material. The piece 50 may be a strap and/or bracket having longitudinal side edges 52 meeting terminal end edges 54. A plurality of cross-slotted through bores 56 are punched or otherwise cut through the material along a longitudinal centerline and at equally spaced intervals indicated at "x" in the drawing. While only a single row of bores 56 is illustrated in the drawing, it will be recognized that, for a wider piece 50, multiple longitudinal rows of bores may be cut through the material to accomodate the wider width of the piece. In the figure, both cross-slotted bores 56 and T-shaped bores 58 are shown as both of these may be applicable to fastening the piece 50 using a fastener 10. For example, the piece 50 may have its ends 54 turned back onto one another to form a substantially circular configuration about a part and/or a plurality of parts to band them together until the slotted bores 56 and 58 are in registration. A fastener 10 may then be passed through the bores in the manner hereinbefore described to fasten the terminal ends 54 in a face-to-face orientation. Alternatively, the piece 50 may be connected and/or fastened to one or more other pieces 50 using fasteners 10, and this, to accomplish many other types of fastening applications. In this respect also, it will be appreciated that the fastening system of this invention may as well be applied to interconnecting other types of materials such as, for example, plastics, fabrics, and/or other type synthetic materials. Thus, the invention is not considered limited by the exact type of material that is fastened together using a fastener 10.

Figure 7:
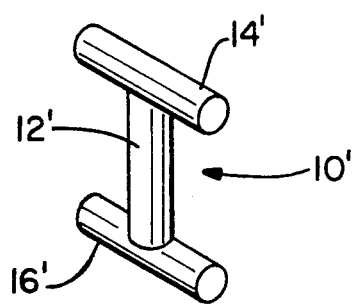
FIG. 7 is a perspective view of an alternative embodiment of the fastener comprising the invention.

It will also be recognized by those knowledgeable in the fastening arts that the fastener 10 may exhibit various cross-sectional configurations other than the obvious rectangular cross-sectional shape illustrated in FIGS. 1-4 of the drawings. For example and as illustrated in FIG. 7, the fastener may comprise a substantially circular cross-sectional shape and such fastener is indicated in the drawing by reference numeral 10'. In this respect also, the fastener 10 may be comprised of a stem portion 12 that is substantially rectangular while the cross bar portions may be circular in cross-section as illustrated in FIG. 7 at reference numerals 14' and 16'. Of course, it will be recognized by those knowledgeable in the fastening arts that various others of the geometric shapes may be applied to the cross-sectional configuration of the fastener 10 and some of the most applicable ones are illustrated in FIG. 10 of the drawings. In this respect also, the cross-sectional shape of the fastener 10 may dictate what the exact configuration of the slotted through bores should be in the pieces to be fastened together. For example, FIG. 6 illustrates two configurations of the cross-slotted bore and these are indicated at reference numerals 56 and 56'. In the same manner, the T-shaped bore may be configured differently for variations in the shape of the fastener 10 and these are indicated by the reference numerals 58 and 58'. Obviously, the exact shape of the slotted through bore should be such that a fastener 10 may be passed through the piece while providing a locking mechanism for seating the fastener within the bore.

Referring now also to FIGS. 8 and 9 of the drawings, an alternative configuration for a slotted through bore is illustrated as such may be cut or otherwise formed through a piece indicated generally by reference numeral 60. The piece 60 may be comprised of a metallic material or other types of suitable strapping and/or belting type material as may be desired for a particular application. For example, the piece 60 may be comprised of a suitable plastic, elastomeric, or other type synthetic material exhibiting the properties desired for a specific application. In any event, the piece 60 is characterized by a plurality of longitudinally oriented slotted through bores 62 exhibiting a bore length $L_2$ which is sufficient for passing the cross bar portions 14 and 16 of the fastener 10 therethrough in the manner hereinbefore described. However, and because of the singular slot configuration of the bore 62, a fastener 10 must be rotated a quarter turn such as to effect locking it in place within the slot bore. In FIG. 9, a fastener 10 is illustrated in ghost dot-dashed lines above the piece 60 to show how it may be first positioned for insertion through the bore 62 and then rotated a quarter turn, i.e., 90 degrees with respect to its I-shaped configuration. The fastener 10 is then turned such that the cross bar portions 14,16 are positioned transversely to the direction of the bore 62. When the strap 60 is used in the horizontal position as shown in FIG. 9, the fastener 10 exhibits an H-shaped configuration. An example where a strap configured piece 60 may be used in the orientation illustrated in FIG. 9 is in the clothing industry wherein fashion belts are worn by both men and women. In this application, the fastener 10 may be configured into a decorative piece and used as a belt adjusting device when slotted through bores 62 are cut through the one terminal end while a single bore 62 is cut through the opposite end for maintaining the fastener belt buckle in position on the belt.

There will, of course, be many other applications for the fastener of the present invention and the manner of its application is not considered to be limiting in any way. There will be particular applications, for example, where any relative movement as between face-to-face engaged pieces may be detrimental. Accordingly, it is anticipated that such relative movement may be substantially reduced or eliminated altogether by providing pieces having corresponding surfaces which exhibit a roughened quality. In FIG. 8, for example, the piece 60 may have an end surface area indicated at reference numeral 64 which will exhibit a roughened quality by reason of surface protrusions which will effect a gripping relationship as between it and another surface area 66 when these two surfaces are placed into planar face-to-face contacting engagement. Of course, the surfaces 64 and 66 may be on the same piece 60 as shown in FIG. 8 or, they may be on different and separate pieces. There are, of course, many types of surface configurations which may be applied to accomplish maintaining the pieces in a substantially stationary relative position and these may include well known ridge-and-valley type transverse undulations and/or random peaks-and-valley type configurations. The terminology "roughened", therefore, is considered to cover any type of surface protrusions which may be applied to the pieces when such are are fastened together in planar face-to-face contacting engagement by a fastening means 10 such as to reduce any relative movement between the pieces.

Finally, while certain representative embodiments and details have been shown for the purpose of illustrating the present invention, it will be apparent to those skilled in this art that various changes and/or modifications may be made thereto without departing from the spirit or scope of the invention.

What is claimed is:

1. A fastening system comprising in combination:
   at least two substantially planar pieces, each of which has two opposite faces and at least one slotted bore extending through the piece from one face to the other, the pieces being positioned in adjacent face-to-face contact with each other and with at least one bore of one planar piece being substantially aligned with a bore in the other piece, the contacting faces of the pieces being the inner faces and the opposite faces being the outer faces; and
   fastener characterized by a central stem portion having a cross bar portion positioned transversely across each of its ends, the cross bar portion on at least one end of the stem being of a size and shape to pass through a certain location in the aligned bores in both pieces when the fastener is oriented in the proper position with respect to the bores, said fastener interconnecting the pieces together by having the stem of said fastener extending through the bores in both pieces and the cross bar portion on each end of the stem lying outside the bores in such a position that when the fastener is placed in tension by relative sliding movement of at least one of the planar pieces with respect to the other, the fastener tilts within the bores causing the cross bar portions to bear against the outer faces of the pieces to clamp the pieces together in planar face-to-face contact with each other.

2. The fastening system as claimed in claim 1 wherein the slotted bores are characterized by horizontal and vertical slotted bores which intersect to define a cross-slotted configuration.

3. The fastening system as claimed in claim 1 wherein the slotted bores are characterized by horizontal and vertical slotted bores which intersect to define a T-shaped slot configuration.

4. The fastening system as claimed in claim 1 wherein the slotted bores are characterized by a single lengthwise oriented slot and the fastener is inserted through the slot and rotated a quarter turn to lock it in place.

5. The fastening system as claimed in claim 1 wherein the pieces are thin guaged metallic straps and the fastener is characterized by an I-shaped configuration which maintains the straps in a locked vertical orientation.

6. The fastening system as claimed in claim 4 wherein the fastener interlocks the terminal ends of a singular piece together in a substantially horizontal orientation.

7. The fastening system as claimed in claim 6 wherein the piece comprises a leather belt.

8. The fastening system as claimed in claim 1 wherein the fastener exhibits a substantially rectangular cross-sectional shape through the stem and cross bar portions.

9. The fastening system as claimed in claim 8 wherein the fastener exhibits a square cross-sectional shape through the stem and cross bar portions.

10. The fastening system as claimed in claim 1 wherein the fastener exhibits a substantially circular cross-sectional shape through the stem and cross bar portions.

11. The fastening system as claimed in claim 1 wherein the fastener exhibits cross-sections through its stem and cross bar portions of a geometric configuration which operates in conjunction with the geometries of the slotted bores through the pieces.

12. A fastening system comprised of at least two pieces exhibiting planar characteristics to be fastened together, each of which has two opposite faces and at least one slotted bore extending through the piece from one face to the other, the slotted bore being characterized by longitudinally and transversely oriented slots, the pieces being positioned in adjacent face-to-face contact with each other and with at least one bore of one planar piece being substantially aligned with a bore in the other piece, the contacting faces of the pieces being the inner faces and the opposite faces being the outer faces; and a fastener having a stem portion and orthogonally oriented cross bar portions at each of its ends which defines the fastener shape, the cross bar portion on at least one end of the stem being of a size and shape to pass through a certain location in the aligned bores in both pieces when the fastener is oriented in the proper position with respect to the bores, said fastener interconnecting the pieces together by having the stem of said fastener extending through the bores in both pieces and the cross bar portion on each end of the stem lying outside the bores in such a position that when the fastener is placed in tension by relative sliding movement of at least one of the planar pieces with respect to the other, the fastener tilts within the bores causing the cross bar portions to bear against the outer faces of the pieces to clamp the pieces together in planar face-to-face contact with each other.

13. The fastening system as claimed in claim 12 wherein the longitudinally and transversely oriented slots define a cross-slotted bore through each of the pieces.

14. The fastening system as claimed in claim 12 wherein the longitudinally and transversely oriented slots define a T-shaped bore through each of the pieces.

15. The fastening system as claimed in claim 12 wherein the fastener exhibits a cross-sectional shape through its stem and cross bar portions which operatively work in conjunction with the slot configuration of the bores through the pieces.

16. A fastening system comprising in combination:

at least two pieces exhibiting planar characteristics, each of which has two opposite faces and at least one longitudinally oriented slotted bore extending through the piece from one face to the other, the pieces being positioned in adjacent face-to-face contact with each other and with at least one bore of one planar piece being substantially aligned with a bore in the other piece, the contacting faces of the pieces being the inner faces and the opposite faces being the outer faces; and a fastener having a stem portion interconnecting orthogonally oriented cross bar portions, the cross bar portion on at least one end of the stem being of a size and shape to pass through a certain location in the aligned bores in both pieces when the fastener is oriented in the proper position with respect to the bores, said fastener interconnecting the pieces together by having the stem of said fastener extending through the bores in both pieces and the cross bar portion on each end of the stem lying outside the bores, the faster being rotated one quarter turn after insertion through the bores, into such a position that when the fastener is placed in tension by relative sliding movement of at least one of the planar pieces with respect to the other, the fastener tilts within the bores causing the cross bar portions to bear against the outer faces of the pieces to clamp the pieces together in planar face-to-face contact with each other.

17. The fastening system as claimed in claim 16 wherein the pieces have a longitudinal length greater than the width and are characterized by at least one longitudinal row of slotted bores through the material comprising the pieces and at equally spaced intervals along the longitudinal axes of the pieces.

18. The fastening system as claimed in claim 16 wherein the pieces have a longitudinal length greater than the width and are characterized by multiple longitudinal rows of slotted bores through the material comprising the pieces and these are at equally spaced intervals along the length of the pieces and a fastener is mounted through the slotted bores of the pieces in each of the rows of bores.

19. The fastening system as claimed in claim 16 wherein the pieces comprise the terminal ends of a belt as may be worn by a person.

20. The fastening system as claimed in claim 16 wherein the pieces are comprised of a thin guage material having a longitudinal length greater than the width, said pieces and fastener applied to fastening other parts together to form a unitary structure.

21. The fastening system as claimed in claim 1 wherein the pieces each have a surface area at the position of their face-to-face orientation which exhibits a roughened quality such as to limit any relative movement as between the pieces.

* * * * *